(12) United States Patent
Kosuri et al.

(10) Patent No.: US 12,731,348 B2
(45) Date of Patent: Sep. 8, 2026

(54) METHODS AND SYSTEMS FOR PRESENTING INTERACTIVE VIRTUAL REPRESENTATIONS OF DEVICES

(71) Applicant: Verizon Patent and Licensing Inc., Basking Ridge, NJ (US)

(72) Inventors: Lokesh Kosuri, Hyderabad (IN); Ravi Kiran Tummala, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 120 days.

(21) Appl. No.: 18/753,310

(22) Filed: Jun. 25, 2024

(65) Prior Publication Data

US 2025/0391123 A1 Dec. 25, 2025

(51) Int. Cl.

*G06T 19/00* (2011.01)
*G06F 3/01* (2006.01)
*G06T 7/60* (2017.01)
*G06T 7/73* (2017.01)
*G06T 17/20* (2006.01)

(52) U.S. Cl.

CPC ............ *G06T 19/006* (2013.01); *G06F 3/017* (2013.01); *G06T 7/60* (2013.01); *G06T 7/73* (2017.01); *G06T 17/20* (2013.01); *G06T 2200/24* (2013.01); *G06T 2207/30196* (2013.01)

(58) Field of Classification Search

CPC ........... G06T 19/006; G06T 7/60; G06T 7/73; G06T 17/20; G06T 2200/24; G06T 2207/30196; G06F 3/017

USPC .......................................................... 345/419

See application file for complete search history.

(56) References Cited

U.S. PATENT DOCUMENTS

| | | | | |
|---|---|---|---|---|
| 11,900,555 | B1 * | 2/2024 | Fieldman | G06T 19/006 |
| 11,990,059 | B1 * | 5/2024 | Fieldman | G06T 11/00 |
| 12,033,293 | B1 * | 7/2024 | Fieldman | G06T 7/60 |
| 12,436,607 | B1 * | 10/2025 | Dasher | G06T 11/00 |
| 12,498,783 | B1 * | 12/2025 | Diem | G02B 27/017 |
| 2016/0246370 | A1 * | 8/2016 | Osman | G06F 3/013 |
| 2017/0185160 | A1 * | 6/2017 | Cho | G06F 3/016 |
| 2019/0212808 | A1 * | 7/2019 | Soelberg | A63F 13/212 |
| 2019/0391710 | A1 * | 12/2019 | Shen | G06F 3/04883 |
| 2020/0218336 | A1 * | 7/2020 | Chang | G06F 3/011 |
| 2022/0027115 | A1 * | 1/2022 | Haapoja | G09G 5/14 |
| 2022/0028108 | A1 * | 1/2022 | Haapoja | G06Q 30/0633 |
| 2023/0139626 | A1 * | 5/2023 | Berliner | G06F 3/1423 345/156 |

(Continued)

OTHER PUBLICATIONS

Kim et al.; "Touch and hand gesture-based interactions for directly manipulating 3D virtual objects in mobile augmented reality"; Multimedia Tools (Year: 2016).*

(Continued)

*Primary Examiner* — David T Welch

(57) ABSTRACT

An exemplary method includes a computing system receiving, via a user interface, a request from a user for a virtual representation of a device and accessing, based on receiving the request, a virtual model of the device. The method further includes generating, based on imagery of a hand of the user, a virtual model of the hand of the user and providing, via the user interface and based on the virtual model of the device and the virtual model of the hand of the user, an interactive virtual representation of the device as held in the hand of the user.

20 Claims, 10 Drawing Sheets

(56) References Cited

U.S. PATENT DOCUMENTS

| | | | | |
|---|---|---|---|---|
| 2023/0280840 | A1* | 9/2023 | Chang | G06T 7/246<br>345/156 |
| 2023/0341936 | A1* | 10/2023 | Inoue | G06F 3/0325 |
| 2024/0221333 | A1* | 7/2024 | Jiang | G06T 19/20 |
| 2025/0004541 | A1* | 1/2025 | Wu | G06T 15/00 |
| 2025/0061658 | A1* | 2/2025 | Luidolt | G06T 7/70 |
| 2025/0076989 | A1* | 3/2025 | Fieldman | G06F 3/04845 |
| 2025/0130625 | A1* | 4/2025 | Nagano | G06F 3/0346 |

OTHER PUBLICATIONS

Bai et al.; "Bringing full-featured mobile phone interaction into virtual reality"; Computers & Graphics; Elsevier (Year: 2021).*

Matulic et al.; "Phonetroller: Visual Representations of Fingers for Precise Touch Input with Mobile Phones in VR"; ACM (Year: 2021).*

* cited by examiner

METHODS AND SYSTEMS FOR PRESENTING INTERACTIVE VIRTUAL REPRESENTATIONS OF DEVICES

BACKGROUND INFORMATION

In various scenarios, an extended reality system that implements one or more types of extended reality technology (e.g., augmented reality technology, virtual reality technology, etc.) may be configured to render a virtual object in a three-dimensional ("3D") scene. For example, in certain implementations of augmented reality technology, a virtual object may be rendered so as to appear to be part of the real world (e.g., at a location proximate to a user experiencing the augmented reality technology). As another example, in certain implementations of virtual reality technology, a virtual object may be rendered so as to appear to be part of a virtual reality world. An extended reality system (e.g., a virtual reality, augmented reality, or other such device/system) may present a representation of the object to be experienced by one or more users by way of extended reality technologies such as virtual reality, augmented reality, and/or other such technologies.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Systems and methods for presenting interactive virtual representations of devices are described herein. In certain examples, for instance, an exemplary method may include a computer system (e.g., an extended reality system) receiving, via a user interface, a request from a user for a virtual representation of a device and accessing, based on receiving the request, a virtual model of the device. The method may further include generating, based on imagery of a hand of the user, a virtual model of the hand of the user and providing, via the user interface and based on the virtual model of the device and the virtual model of the hand of the user, an interactive virtual representation of the device as held in the hand of the user.

Various advantages and benefits are associated with the systems and methods for presenting interactive virtual representations of devices described herein. For example, systems and methods such as those described herein may provide a user experience that virtually emulates a storefront for evaluating and/or purchasing devices. The system may present interactive virtual representations that provide a realistic look and feel of devices as held in the hand or hands of the user, with an accurate size and simulated device operation. Thus, the user may evaluate and compare devices as if in a store via a virtual experience, such as by way of an augmented reality or virtual reality interface. These and other benefits that may be provided by systems and methods described herein will be evident from the disclosure that follows.

Figure 1:
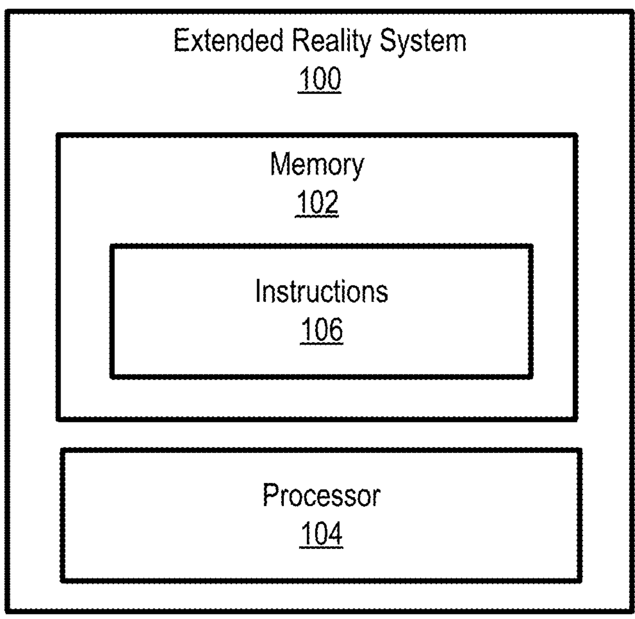
FIG. 1 illustrates an exemplary extended reality system according to principles described herein.

FIG. 1 illustrates an exemplary extended reality system 100 ("system 100") that may be implemented according to principles described herein. As shown, system 100 may include, without limitation, a memory 102 and a processor 104 selectively and communicatively coupled to one another. Memory 102 and processor 104 may each include or be implemented by hardware and/or software components (e.g., processors, memories, communication interfaces, instructions stored in memory for execution by the processors, etc.). In some examples, memory 102 and/or processor 104 may be implemented by any suitable computing device. In other examples, memory 102 and/or processor 104 may be distributed between multiple devices and/or multiple locations as may serve a particular implementation. Illustrative implementations of system 100 are described herein.

Memory 102 may maintain (e.g., store) executable data used by processor 104 to perform any of the operations described herein. For example, memory 102 may store instructions 106 that may be executed by processor 104 to perform any of the operations described herein. Instructions 106 may be implemented by any suitable application, software, code, and/or other executable data instance.

Memory 102 may also maintain any data received, generated, managed, used, and/or transmitted by processor 104. Memory 102 may store any other suitable data as may serve a particular implementation. For example, memory 102 may store data associated with devices to be presented (e.g., models of devices, sizes of devices, appearances of devices, user interfaces of devices, etc.), gestures for interacting with devices, context information, user information, graphical user interface content, and/or any other suitable data.

Processor 104 may be configured to perform (e.g., execute instructions 106 stored in memory 102 to perform) various processing operations associated with presenting interactive virtual representations of devices. For example, processor 104 may perform one or more operations described herein to provide an interactive virtual representation of a device as held in a hand of a user. These and other operations that may be performed by processor 104 are described herein.

Figure 2:
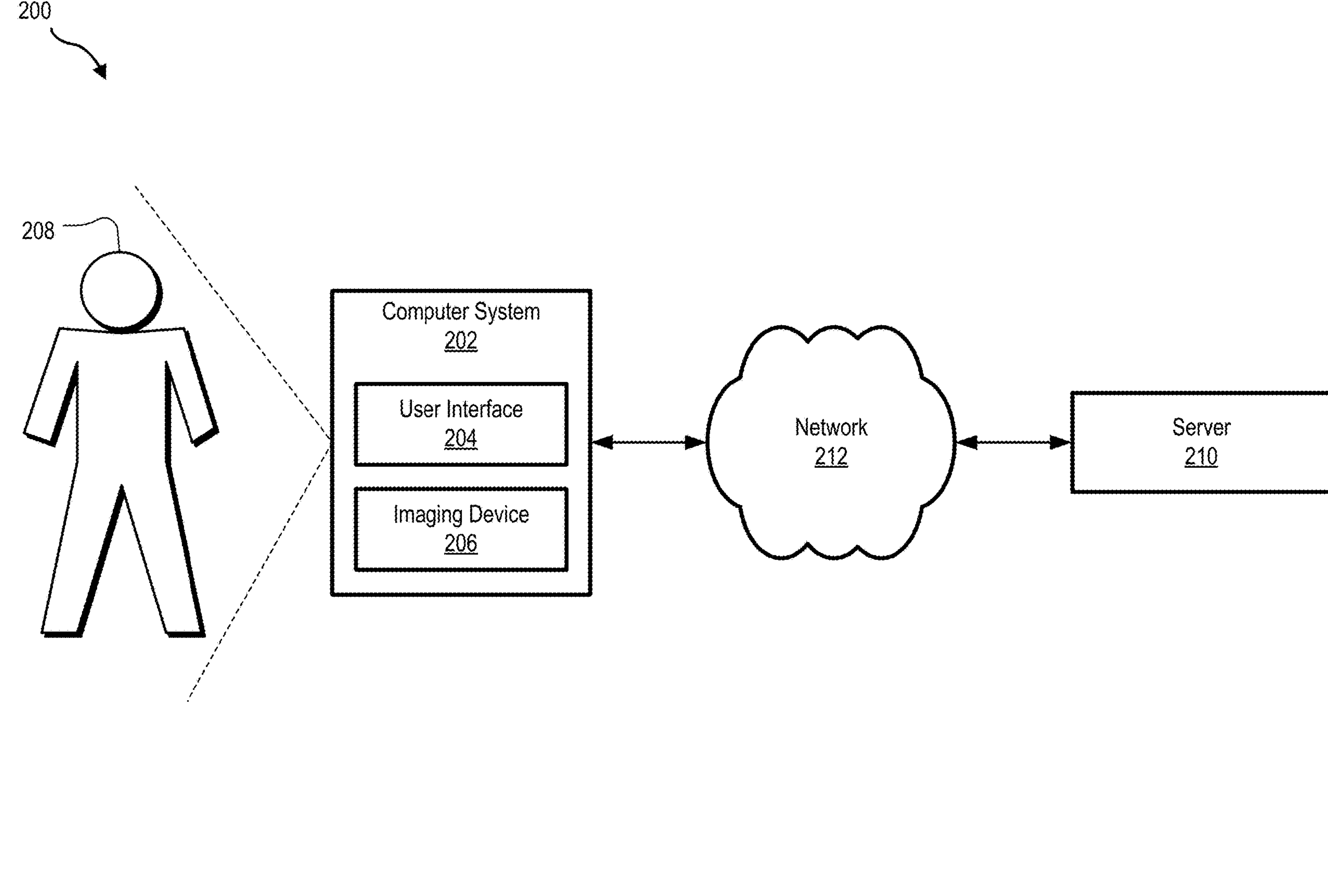
FIG. 2 illustrates an exemplary implementation of the extended reality system of FIG. 1 according to principles described herein.

System 100 may be implemented in any suitable manner. FIG. 2 shows an exemplary implementation 200 in which system 100 may be provided in certain examples. As shown in FIG. 2, implementation 200 includes a computer system 202 that includes a user interface 204 and an imaging device 206. Computer system 202 may include or be implemented by any suitable type of computing device or combination of computing devices as may serve a particular implementation. For example, computer system 202 may be implemented by a desktop computer, a laptop computer, a mobile device such as a smartphone, a tablet computer, a head mounted display device, a virtual reality ("VR") device, an augmented reality ("AR") device, an internet-of-things ("IoT") device, and/or any other suitable device or combination of such devices.

User interface 204 may correspond to any suitable type of user interface as may serve a particular implementation. For example, user interface 204 may correspond to a web interface, an application interface, a device interface (e.g., displayed by a display screen of a laptop computer), a holographic display interface, a VR interface, an AR interface, etc.

Imaging device 206 may correspond to any suitable type of imaging device that may be configured to capture imagery (e.g., imagery in the visible spectrum) of a user 208. For example, imaging device 206 may include or consist of a camera or other type of image capture device. In certain examples, imaging device 206 may additionally or alternatively include a depth camera configured to capture depth images of user 208. As used herein, "imagery" may include any suitable type of image as may serve a particular implementation. For example, imagery may include a single image (e.g., a still image), a moving image (e.g., video or any plurality of sequential images), a depth image, and/or any other suitable type of image.

As shown in FIG. 2, computer system 202 is communicatively connected to a server 210 by way of a network 212. Server 210 may include any suitable computing device or system that may facilitate performing any server-side operations described herein. In certain examples, server 210 may correspond to a cloud server. In certain examples, server 210 may maintain a device database that stores any suitable information, such as described herein, that may be associated with devices and that may be used by computer system 202 to present virtual representations of the devices to user 208. In certain alternative examples, all or a portion of such a device database may be stored internally by computer system 202.

System 100 may be implemented by server 210 or computer system 202. Alternatively, system 100 may be distributed across server 210 and computer system 202, or distributed across server 210, computer system 202, and/or any other suitable computer system/device.

Network 212 may include, but is not limited to, one or more wireless networks (Wi-Fi networks), wireless communication networks, mobile telephone networks (e.g., cellular telephone networks), mobile phone data networks, broadband networks, narrowband networks, the Internet, local area networks, wide area networks, and any other networks capable of carrying data and/or communications signals between server 210 and computer system 202. Communications between computer system 202, server 210, and any other system may be transported using any one of the above-listed networks, or any combination or sub-combination of the above-listed networks.

As will be described further herein, system 100 may be configured to present interactive virtual representations of devices as held in a hand of user 208. To present virtual representations of devices as held in the hand of user 208, system 100 may capture imagery of user 208 while user 208 interacts with user interface 204 of computer system 202. Such imagery may be of the hand of user 208 and may allow system 100 to depict a virtual representation of a device with an accurate size, position, and/or orientation relative to the hand of user 208, so that user 208 may see how the device might fit in the hand of user 208. Additionally or alternatively, such imagery of the hand of user 208 may allow system 100 to capture a gesture of the hand (and/or another hand) that depicts an interaction with the device by user 208. System 100 may capture the imagery in any suitable manner. For example, system 100 may capture imagery of a hand of user 208 via imaging device 206 while user 208 interacts with user interface 204 of computer system 202.

Figure 3:
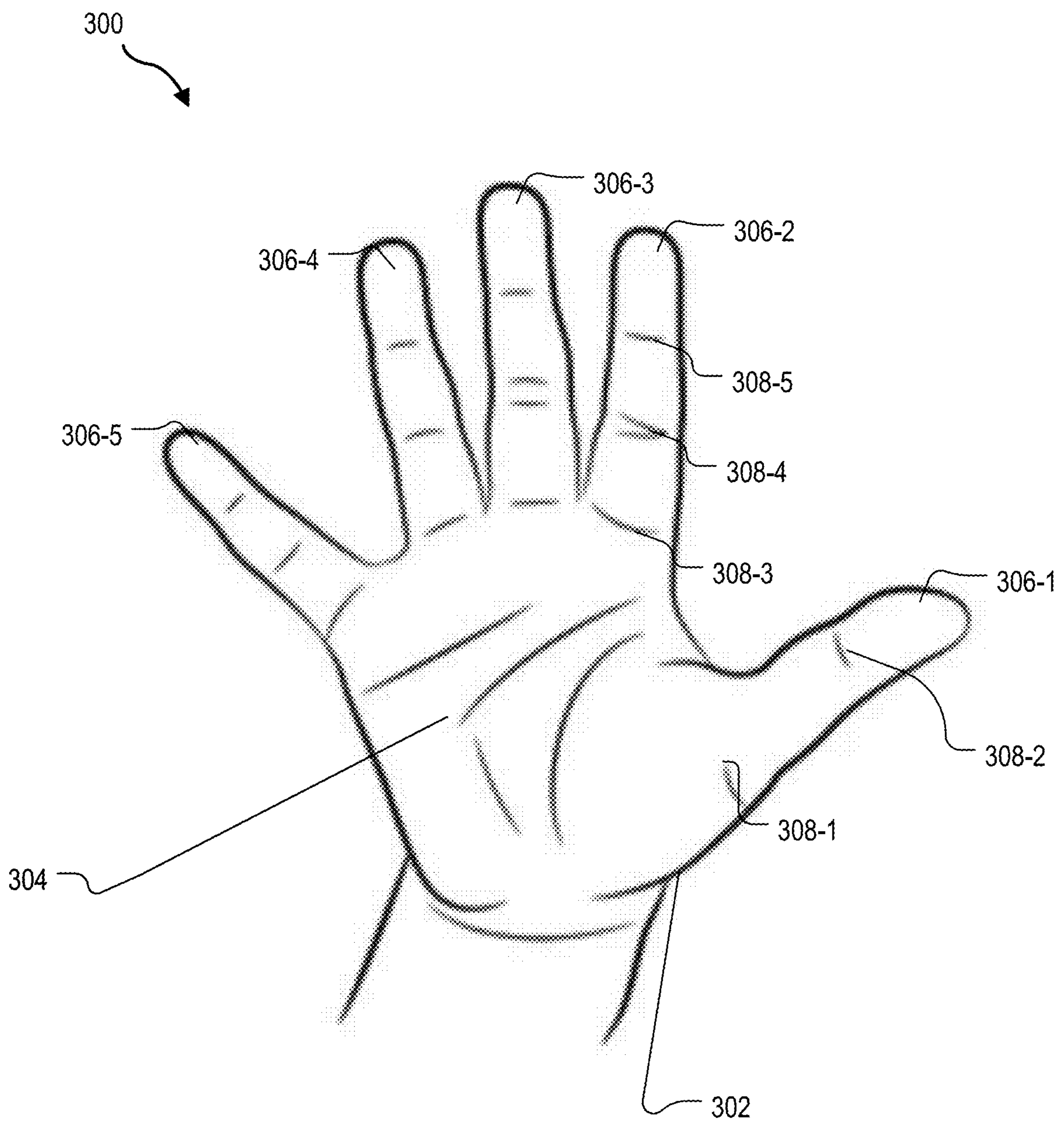
FIG. 3 illustrates an exemplary configuration depicting a hand of a user according to principles described herein.

FIG. 3 illustrates an exemplary configuration that shows an image 300 of a hand 302 of a user (e.g., user 208). As shown, image 300 depicts hand 302 showing a palm 304 of hand 302 and fingers 306 (e.g., fingers 306-1 through 306-5) of hand 302 open. System 100 may use image 300 (and/or any other suitable image(s)) of hand 302 to determine a size of hand 302. System 100 may capture image 300 in any suitable manner. For instance, system 100 may provide a request to user 208 to perform an initial scan of hand 302, where user 208 opens hand 302 with palm 304 of hand 302 facing imaging device 206 so that system 100 may capture image 300 and/or one or more similar images. In some examples, the initial scan may further include one or more images of a back of hand 302 with fingers open. System 100 may use such additional images to further determine the size of hand 302. Additionally or alternatively, system 100 may capture image 300 (and/or similar images) as user 208 interacts with user interface 204 to determine the size of hand 302. For instance, system 100 may analyze imagery captured while user 208 interacts with user interface 204 to determine images that may be similar to image 300 (e.g., images with fingers 306 of hand 302 open) and use such images as calibration images for determining a size of hand 302 and/or updating a determined size of hand 302.

System 100 may determine the size of hand 302 based on image 300 (or one or more images including image 300) in any suitable manner. For instance, system 100 may process image 300 to remove a background of image 300. System 100 may detect transitions between edges to determine respective widths and lengths of hand 302 and fingers 306. Additionally, system 100 may analyze image 300 to detect locations of joints 308 (e.g., joints 308-1 through 308-5, as well as other joints not labeled) of each finger of hand 302. System 100 may determine, based on the detected locations of joints 308, lengths of portions of fingers between joints 308. System 100 may align detected joints 308 with the background-less image as generated by system 100 processing image 300. System 100 may slice the image at the locations of joints 308 and then detect transitions between edges to determine respective lengths of portions of fingers between joints 308. System 100 may further determine a size of palm 304. By determining the size of hand 302 in this (or any suitable) manner, system 100 may generate and provide a virtual representation of a device sized accurately to fit hand 302.

Figure 4:
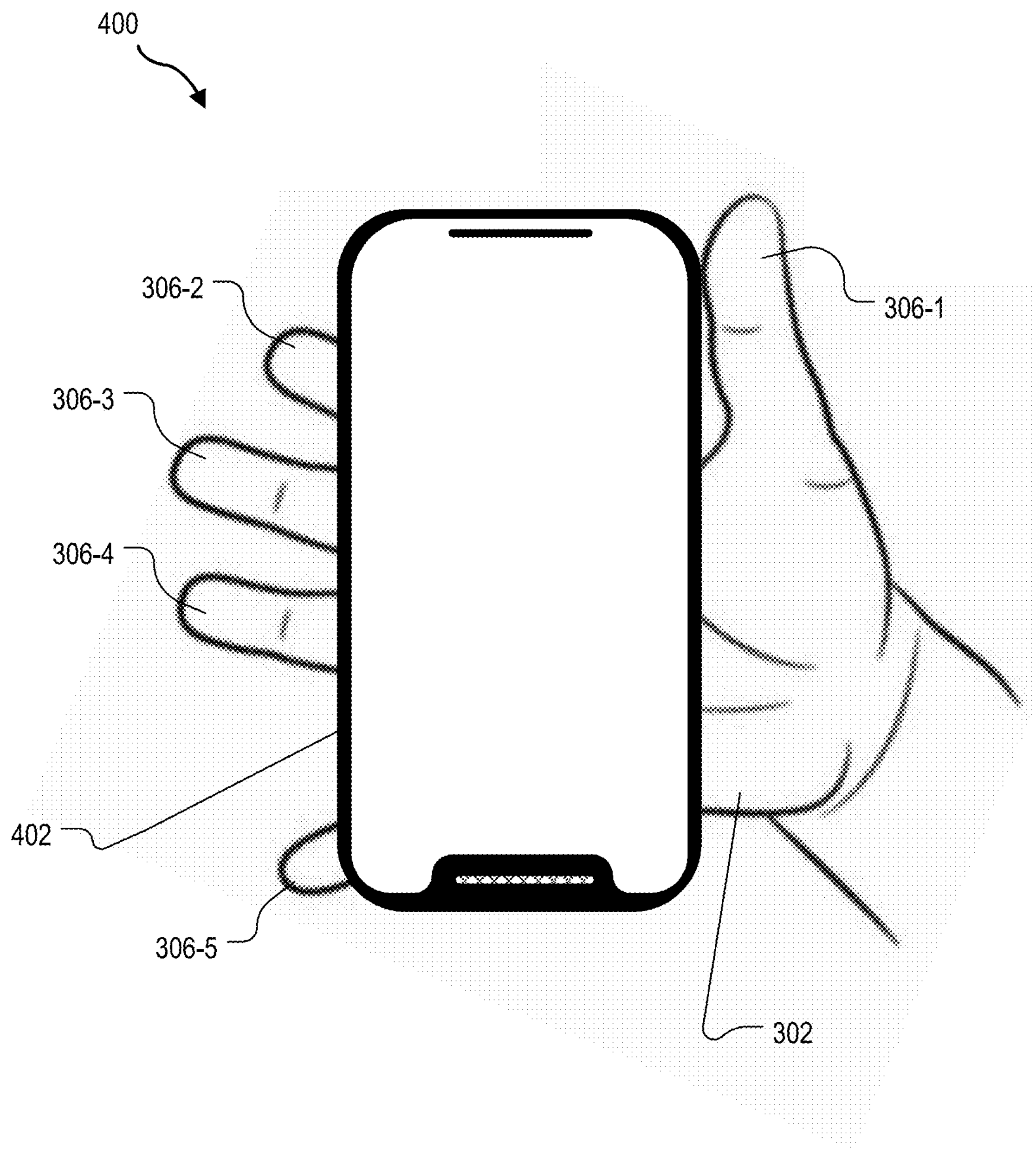
FIG. 4 illustrates an exemplary configuration presenting an interactive virtual representation of a device according to principles described herein.

For example, FIG. 4 illustrates an example configuration 400 that shows hand 302 holding a device (e.g., a phone 402). As described, system 100 (e.g., server 210 and/or computer system 202) may store a device database that includes data associated with devices. Devices may include any suitable devices, such as smartphones, tablets, laptops, desktop computers, smart watches, etc. In some examples, devices may include any device that includes a user interface, such as a touchscreen or a screen and any other suitable input mechanism. Based on the data stored in the device database, system 100 may access a virtual model of a device. For instance, system 100 may present a virtual device store to user 208, where user 208 may interact with devices to consider purchasing a particular device. Thus, user 208 may select a device and request a virtual representation of the device from system 100. System 100 may receive the request and access the device database to access a virtual model of the requested device (e.g., phone 402).

System 100 may access the virtual model in any suitable manner. For example, the device database may store virtual models of the devices, where each virtual model may comprise a dataset that represents a 3D object representing a device. The dataset may be used by system 100 to provide (e.g., render from a viewpoint) a virtual representation (which may be 2D or 3D) of the virtual 3D object. Additionally or alternatively, the device database may store information associated with the devices and system 100 may, based on the information, access the virtual model by generating the virtual model. For example, the device database may include data such as size and appearance for each device, from which system 100 may generate a virtual model of the device.

Based on the virtual model of the device, system 100 may determine a size of the device. Based on the size of the device and the determined size of hand 302, system 100 may accurately and virtually depict, in a user interface view, the device as held in hand 302 of user 208, as in configuration 400. As shown, system 100 may display (e.g., via user interface 204), based on the size of phone 402 and the size of hand 302, a portion of hand 302 occluded by phone 402 (and therefore not visible) and a portion of hand 302 that is not occluded by phone 402 (and thus visible).

Further, system 100 may be configured to detect whether user 208 is curling hand 302 around phone 402. System 100 may determine an amount of curl of hand 302 and further determine, based on the amount of curl, which portions of hand 302 are occluded by phone 402, which portions of hand 302 are visible (e.g., not occluded by phone 402), and which portions of phone 402 may be occluded by hand 302 (e.g., portions of fingers 306) curling around phone 402.

Figure 5:
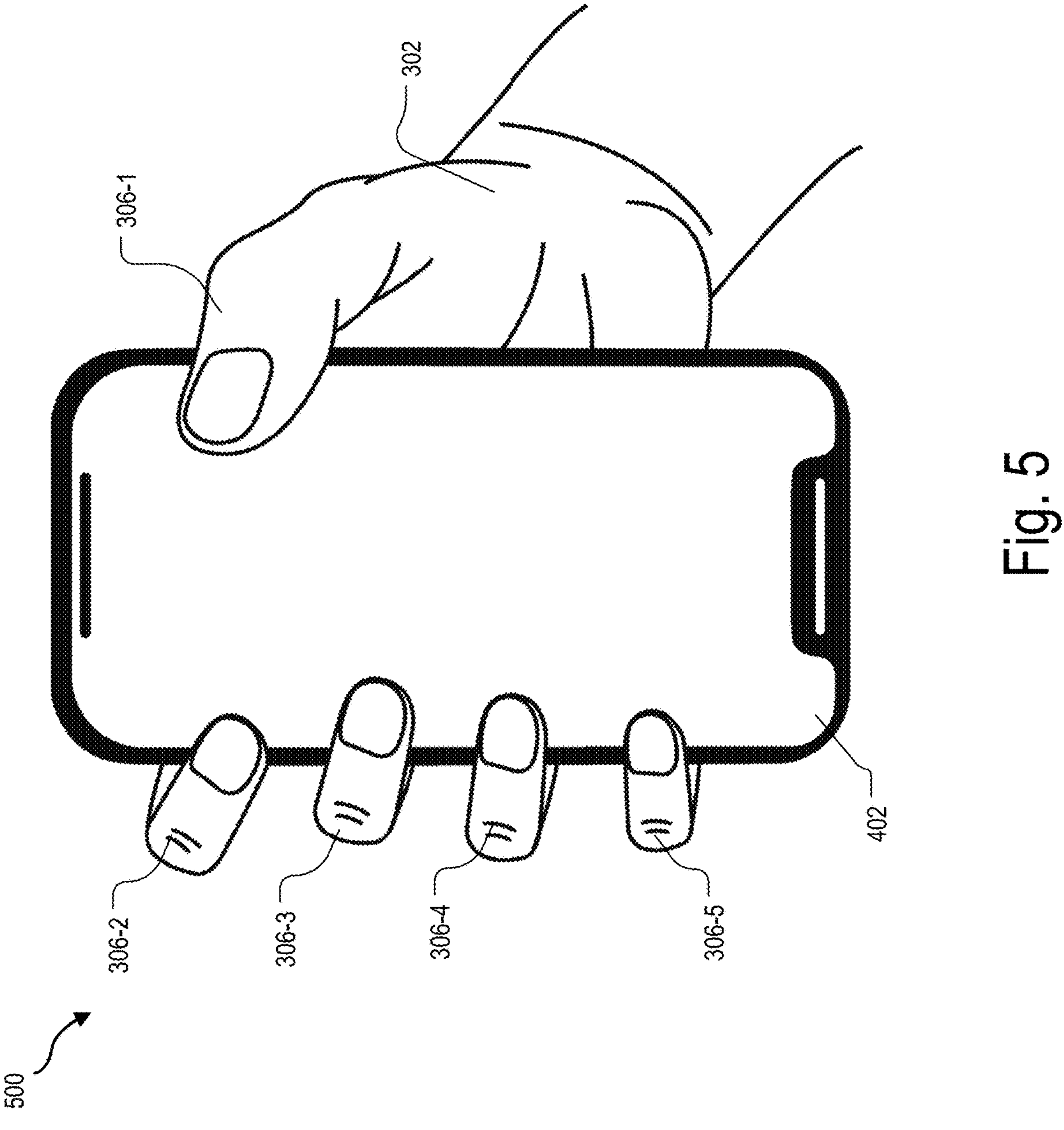
FIG. 5 illustrates another exemplary configuration presenting an interactive virtual representation of a device according to principles described herein.

FIG. 5 illustrates an example configuration 500 that shows hand 302 curled around phone 402. As shown, portions of hand 302, such as tips of fingers 306 (e.g., fingers 306-1 through 306-5), are curled over phone 402 and thus occlude portions of phone 402 from being visible where tips of fingers 306 overlap portions of phone 402. A remaining portion of phone 402 may occlude a portion of hand 302. System 100 may determine which portions of hand 302 occlude phone 402 and which portions of phone 402 occlude hand 302 based on the size of hand 302, size of phone 402, and the amount of curl of hand 302. Additional data may be used for this determination, including position of hand 302, orientation of hand 302, position of phone 402, and orientation of phone 402. In some implementations, this data may be used to represent models of hand 302 and phone 402 relative to one another and/or in a virtual 3D space in which the models of are virtually positioned, oriented, and sized, for example.

System 100 may determine the amount of curl of hand 302 in any suitable manner. For example, as mentioned, system 100 may include a depth sensor such as a light detection and ranging (LiDAR) sensor or any other suitable depth sensor. System 100 may capture depth information via the depth sensor to determine a distance for portions of hand 302 from system 100 (e.g., from user interface 204 and/or imaging device 206). Based on different distances for different portions of hand 302 (e.g., tips of fingers 306 versus palm 304, etc.) system 100 can determine the amount of curl of hand 302. System 100 may further determine the amount of curl of hand 302 based on detected distances between joints 308 in the imagery captured by imaging device 206. For example, as hand 302 curls more, visible distances between joints 308 may decrease compared to an open position of hand 302.

Based on the determined amount of curl of hand 302, as well as the size of phone 402 and size of hand 302, system 100 may present, via user interface 204, a virtual representation of phone 402 as held in hand 302, including portions of hand 302 that curl around phone 402 and thus occlude phone 402. System 100 may perform this in any suitable manner. For instance, system 100 may generate a virtual model of hand 302 of user 208. The virtual model may be any suitable representation of hand 302 of user 208. For example, the virtual model may include a mesh generated based on hand 302, which system 100 may use to display a representation of hand 302 based on imagery captured by imaging device 206 as user 208 moves hand 302. For instance, user 208 may move hand 302 to interact with phone 402, such as hold phone 402 in different positions in hand 302, with different amounts of curl of hand 302 around phone 402. System 100 may continually capture imagery as user 208 moves hand 302 and/or phone 402 in hand 302. Based on the imagery (which, as described, may include depth information), system 100 may update the determined amount of curl of hand 302 and manipulate the virtual model of hand 302 to provide a realistic representation of phone 402 in hand 302 of user 208, including portions of phone 402 occluded by hand 302 and vice versa.

Figure 6:
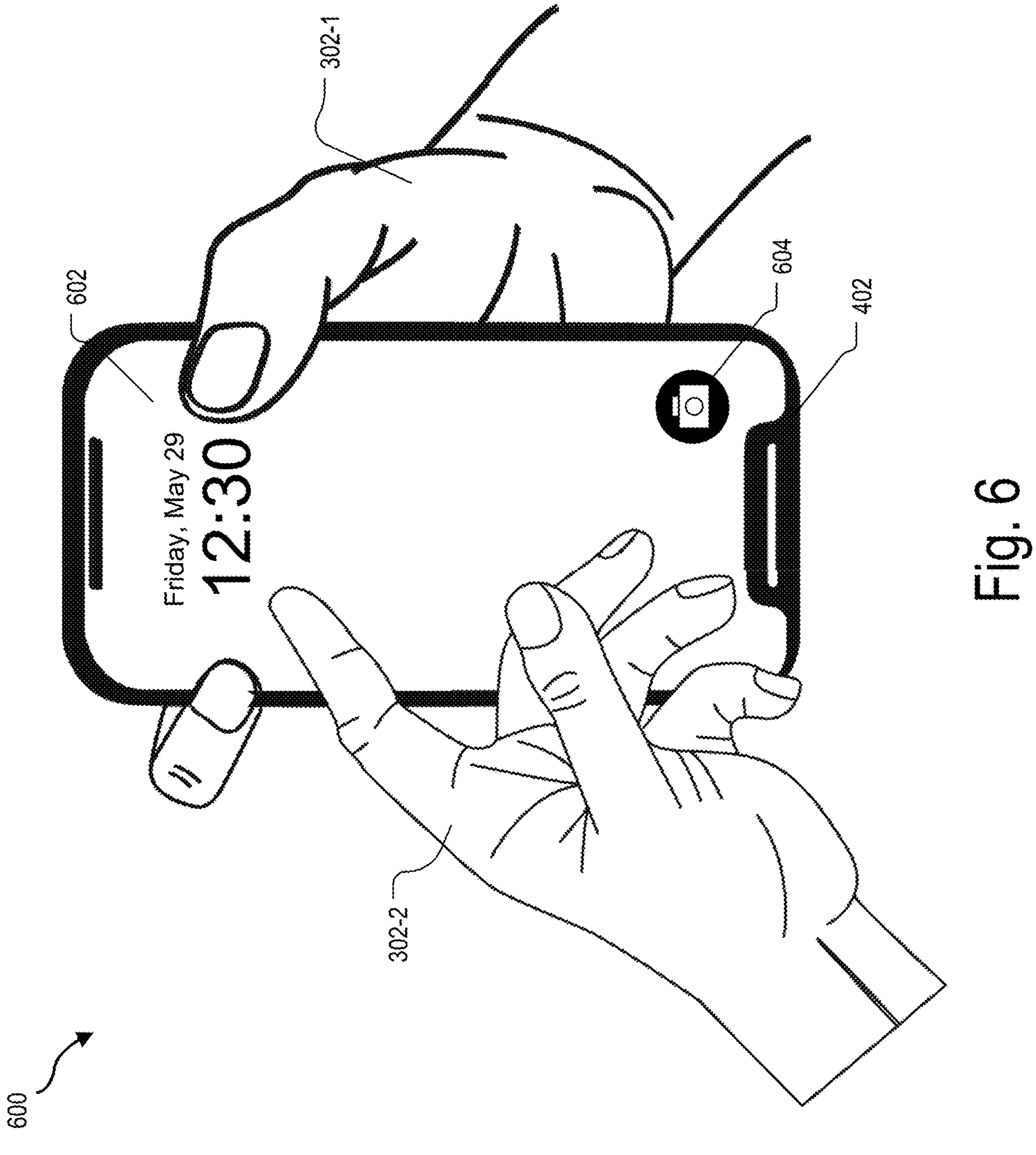
FIG. 6 illustrates another exemplary configuration presenting an interactive virtual representation of a device according to principles described herein.

Further, the interactive virtual representation of the device may include a virtual representation of a user interface of the device with which user 208 may interact. For example, FIG. 6 illustrates an example configuration 600 that shows a virtual representation of a user interface 602 of phone 402. System 100 may detect gestures of user 208 based on imagery of hands 302 (e.g., hand 302-1 and hand 302-2) interacting with phone 402. For example, user 208 may press a button on the virtual representation of phone 402 that may turn phone 402 on or off. In response, system 100 may turn on or off the virtual representation of content of simulated user interface 602. Additionally or alternatively, user interface 602 of phone 402 may be simulated to turn on based on a position of phone 402 (e.g., if user 208 lifts phone 402 or changes a pose of phone 402). System 100 may detect such a change in position of phone 402 based on a gesture of hand 302-1 and/or hand 302-2 in relation to phone 402 and virtually turn on user interface 602 accordingly.

Additionally or alternatively, user 208 may press buttons on or otherwise interact with user interface 602. System 100 may detect and depict interactions with phone 402 based on such gestures. For example, user 208 may press a virtual camera button 604, which may be displayed on a lock screen of phone 402. System 100 may detect such a gesture and display a simulation of a camera application interface on phone 402, which user 208 may further interact with to take virtual photos. Additionally or alternatively, user 208 may virtually swipe on the screen of phone 402 in a manner that would unlock phone 402. System 100 may detect such a gesture and display via user interface 602 a home screen that may display additional applications as provided by phone 402 (e.g., default applications via an operating system of phone 402).

System 100 may display such application interfaces and interactions in any suitable manner. For example, the information included in the device database associated with each device may include information for presenting a virtual operating system and virtual applications for each device (simulated to be running on a virtual representation of a device). System 100 may detect gestures of hand 302-1 and/or hand 302-2 as user 208 virtually interacts with phone 402 and translate such gestures into interactions with the virtual operating system and/or virtual applications. System 100 may then depict responses to such interactions by providing an appropriate corresponding display on user interface 602 in accordance with the gestures.

In this manner, system 100 may provide an interactive virtual representation of phone 402 or any suitable device that emulates an actual physical experience of phone 402. For instance, system 100 may provide a virtual storefront in which user 208 may try various devices to consider which to purchase. By providing an emulated look and feel of each device as held in hand 302 of user 208 that may accurately depict a size and user experience with the operating system and applications of the devices, system 100 may help user 208 make an informed decision on devices virtually.

For example, system 100 may present interactive virtual representations of a plurality of devices with which user 208 may interact. As an example, system 100 may present a list of devices from which user 208 may select a plurality of devices to be displayed. For instance, system 100 may present a current device owned by user 208 to compare with other devices. Additionally or alternatively, system 100 may present a virtual storefront that may include a depiction of a table or any other suitable surface with the selected plurality of devices or any plurality of devices virtually displayed on the surface. The surface may be based on imagery captured by imaging device 206, such as a table or a wall in a physical environment of user 208. Thus, system 100 may provide an augmented reality environment that displays virtual representations of devices on the physical table or wall. Additionally or alternatively, system 100 may present a virtual surface (in a VR or AR interface) for presenting the virtual devices.

For an AR interface with a physical surface, system 100 may scan the surface (e.g., using imaging device 206 and/or other device including a depth sensor) and compute a distance of the surface from imaging device 206 and/or other component of system 100 (e.g., a head mounted display device). System 100 may use the distance to accurately present a size of virtual representations of devices on the surface. System 100 may then capture imagery of hands 302 of user 208 as user 208 interacts with one or more devices on the surface. For instance, user 208 may pick up one or more devices, such as one device in one hand 302-1 and another device in another hand 302-2 to compare size and/or fit of the devices. Additionally or alternatively, user 208 may interact with simulated user interfaces of one or more devices while holding a device in hands 302 and/or leaving the device on the surface. System 100 may capture one or more gestures in relation to devices as described to present interactions with the devices (e.g., user interfaces of the devices) in accordance with the one or more gestures.

In this or a similar manner, a user may physically move one or both of their hands within a field of view of an image capture device, and system 100 may use imagery of the hand(s) to translate movements of the hand(s) into interactions with one or more virtual models of devices. System 100 may provide, via a display screen, virtual representations of such interactions of the hand(s) with the one or more virtual models of the devices, with the virtual models correctly sized and/or fitted to the hand(s) based on determined size(s) (and one or more other attributes such as position(s), orientation(s), and/or curl(s)) of the hand(s). This may allow the user to evaluate, based on the represented virtual interactions, how well a device may fit within a hand, for example.

Figure 7:
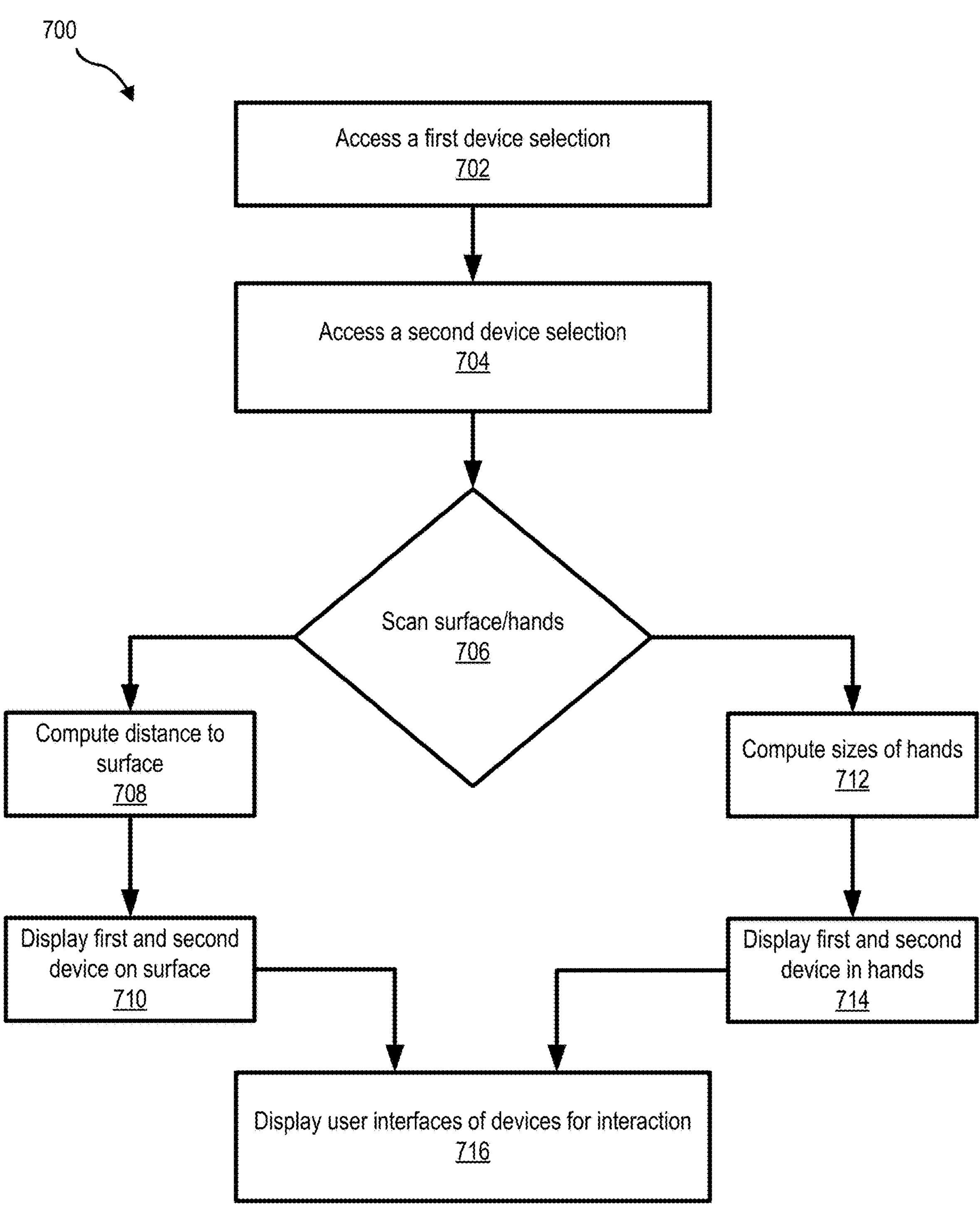
FIG. 7 illustrates an exemplary method for presenting an interactive virtual representation of a device according to principles described herein.

FIG. 7 illustrates an exemplary method 700 for presenting interactive virtual representations of devices. While FIG. 7 illustrates exemplary operations according to one embodiment, other embodiments may add to and/or modify the operations shown in FIG. 7. The operations shown in FIG. 7 may be performed by system 100, any components included therein, and/or any implementation thereof.

At operation 702, a computing system (e.g., extended reality system 100) accesses a first device selection. Operation 702 may be performed in any of the ways described herein. For example, a user may select a first device via a user interface of the system. Additionally or alternatively, the system may access information associated with the user, such as a current device of the user as a first device selection.

At operation 704, the system accesses a second device selection. Operation 704 may be performed in any of the ways described herein. For instance, the user may select a second device via the user interface of the system. Additionally or alternatively, the system may present a plurality of devices, such as via an AR or VR interface, from which the user may select a device, for example, by picking the device up or otherwise indicating the device selection.

At operation 706, the system scans a surface of an object and/or hands of the user. Operation 706 may be performed in any of the ways described herein.

If a surface is scanned, at operation 708, the system computes a distance to the surface and at operation 710, the system displays virtual representations of the first and second devices on the surface. Operations 708 and 710 may be performed in any of the ways described herein.

If hands of a user are scanned at operation 706, that at operation 712, the system computes sizes of hands of the user. At operation 714, the system displays virtual representations of the first and second devices in the hands of the user. Operations 712 and 714 may be performed in any of the ways described herein.

At operation 716, the system displays simulated user interfaces for the first and second devices, with which the user may interact. Operation 716 may be performed in any of the ways described herein, including by displaying simulated user interface views on virtual representations of the display screens of the first and second devices.

Figure 8:
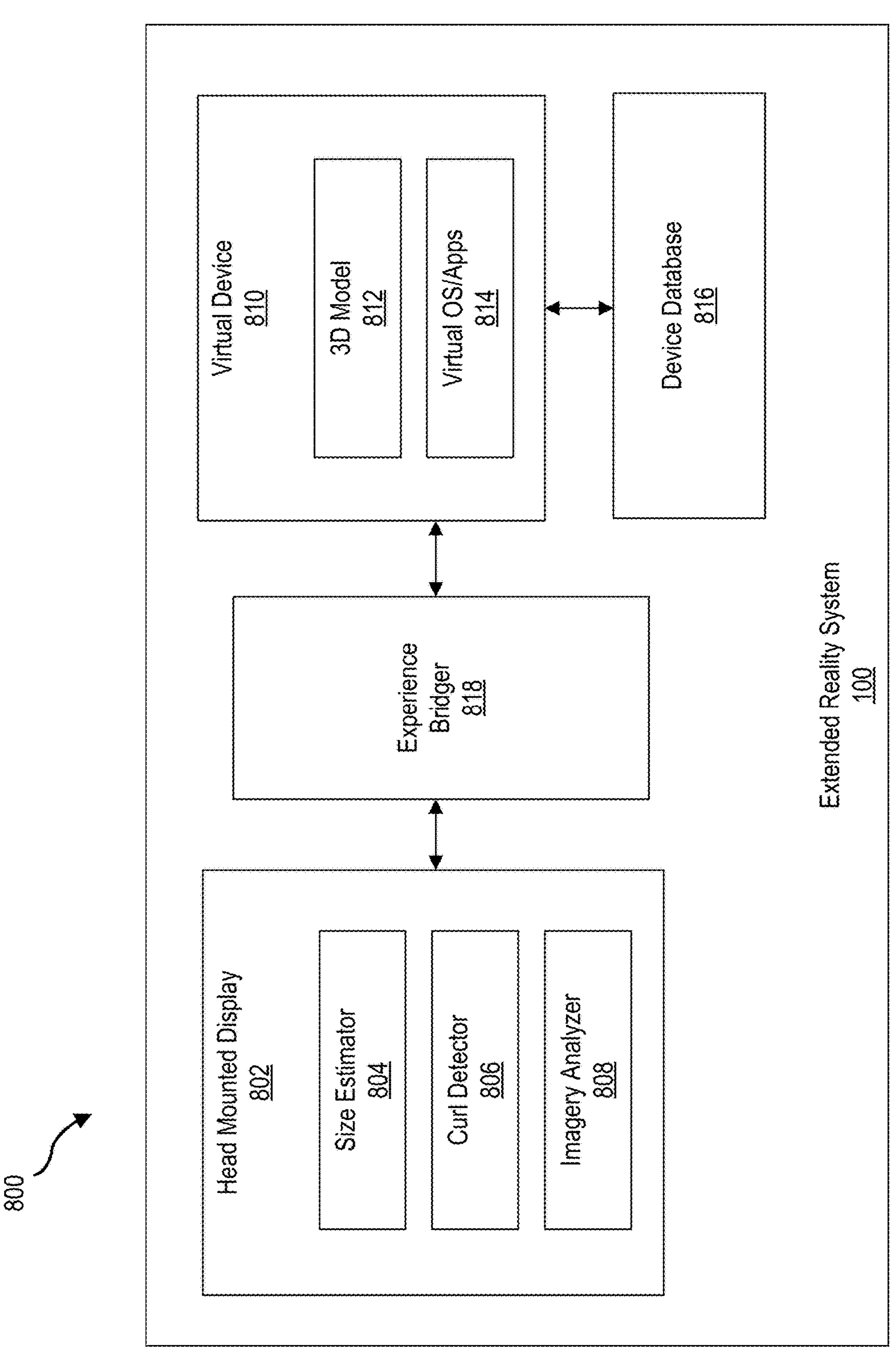
FIG. 8 illustrates an exemplary configuration of a computer system for presenting an interactive virtual representation of a device according to principles described herein.

FIG. 8 illustrates an exemplary configuration 800 of an extended reality system (e.g., system 100). In configuration 800, system 100 may be implemented including a head mounted display 802, which, although not shown in FIG. 8, may include an imaging device (e.g., imaging device 206) as well as a display for presenting an AR and/or VR interface to a user. Head mounted display 802 may include a size estimator 804, a curl detector 806, and an imagery analyzer 808. As described, size estimator 804 may estimate a size of hands of the user and/or a size and/or a distance of a surface from head mounted display 802. Curl detector 806 may determine an amount of curl of the user's hands, as described herein. Based on the amount of curl and the estimated size of the user's hands, head mounted display 802 may present a virtual representation of a virtual device 810 as held in the hands of the user. Imagery analyzer 808 may detect gestures of the user's hands as captured in imagery by head mounted display 802. Based on the gestures, system 100 may depict interactions with virtual device 810.

For example, virtual device 810 may include a 3D model 812 and a virtual operating system and/or applications 814. Such information may be stored in and accessed from a device database 816. System 100 may further include an experience bridger 818 that translates gestures detected by imagery analyzer 808 into interactions via the virtual operating system and/or applications 814 and presents such interactions on virtual device 810 as described herein.

Figure 9:
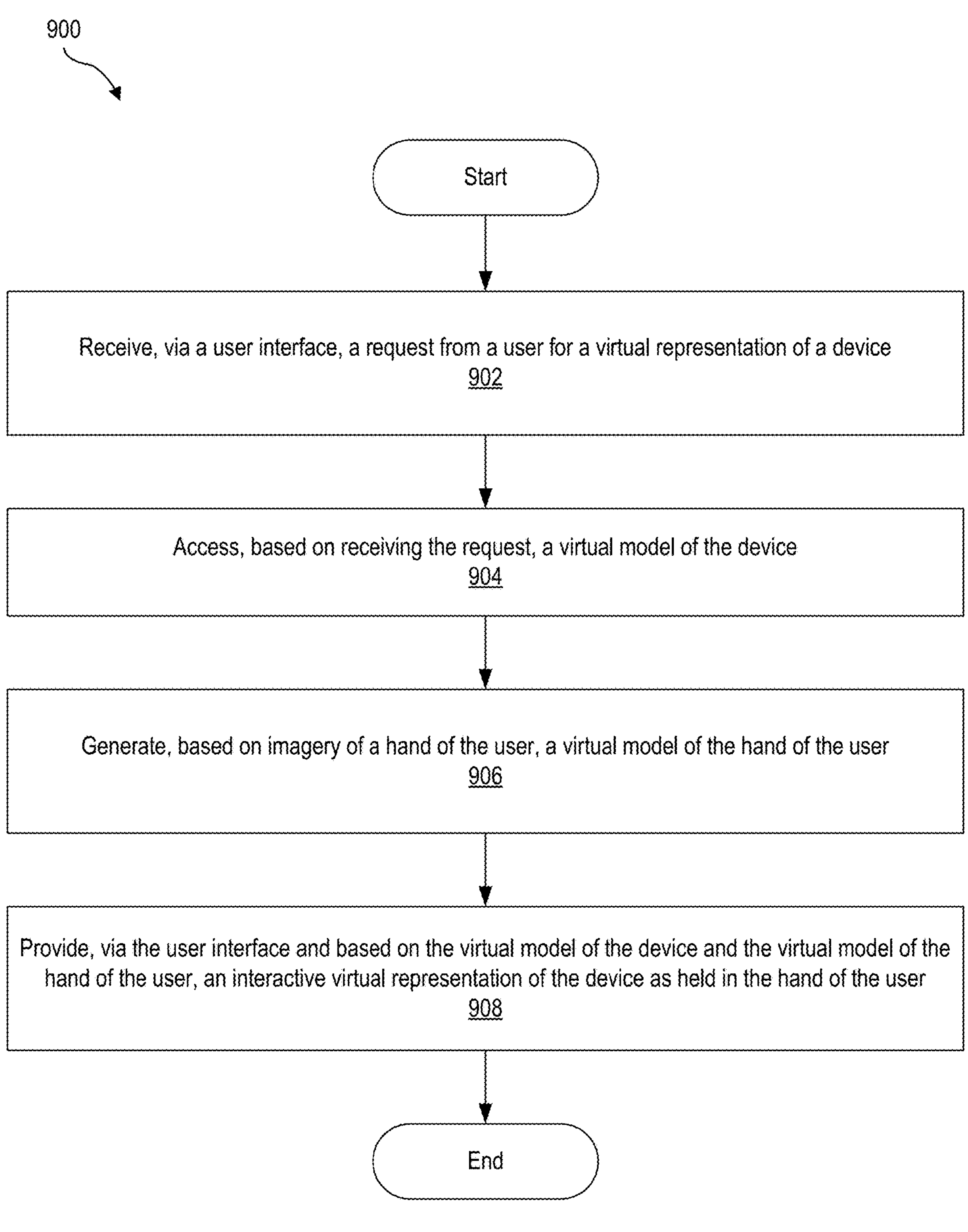
FIG. 9 illustrates an exemplary method for presenting an interactive virtual representation of a device according to principles described herein.

FIG. 9 illustrates an additional exemplary method 900 for presenting interactive virtual representations of devices. While FIG. 9 illustrates exemplary operations according to one embodiment, other embodiments may add to and/or modify the operations shown in FIG. 9. The operations shown in FIG. 9 may be performed by system 100, any components included therein, and/or any implementation thereof.

At operation 902, a computing system (e.g., extended reality system 100) may receive, via a user interface, a request from a user for a virtual representation of a device. Operation 902 may be performed in any of the ways described herein.

At operation 904, the system may access, based on receiving the request, a virtual model of the device. Operation 904 may be performed in any of the ways described herein.

At operation 906, the system may generate, based on imagery of a hand of the user, a virtual model of the hand of the user. Operation 906 may be performed in any of the ways described herein.

At operation 908, the system may provide, via the user interface and based on the virtual model of the device and the virtual model of the hand of the user, an interactive virtual representation of the device as held in the hand of the user. Operation 908 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory (RAM), and an optical disc (e.g., a compact disc, a digital video disc, a Blu-ray disc, etc.). Exemplary volatile storage media include, but are not limited to, RAM (e.g., dynamic RAM).

Figure 10:
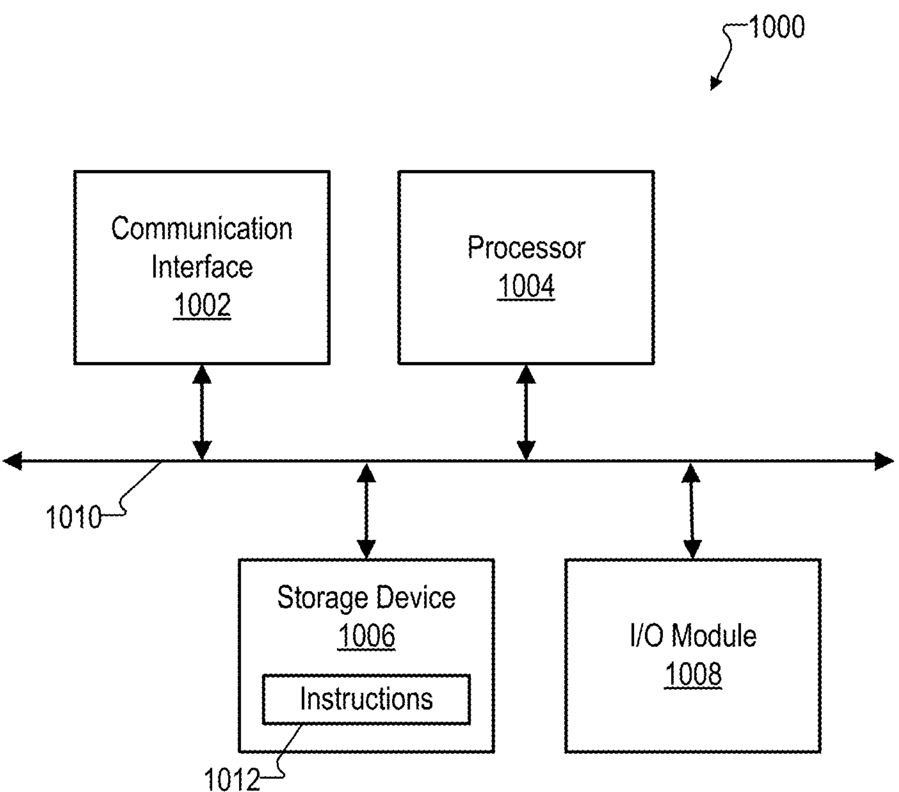
FIG. 10 illustrates exemplary components of a computing device according to principles described herein.

FIG. 10 illustrates exemplary components of a computing device 1000 that may be specifically configured to perform one or more of the processes described herein. As shown in FIG. 10, computing device 1000 may include a communication interface 1002, a processor 1004, a storage device 1006, and an input/output (I/O) module 1008 communicatively connected one to another via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data and/or interpreting, executing, and/or directing execution of one or more of the instructions, processes, and/or operations described herein. Processor 1004 may perform operations by executing computer-executable instructions 1012 (e.g., an application, software, code, and/or other executable data instance) stored in storage device 1006.

Storage device 1006 may include one or more data storage media, devices, or configurations and may employ any type, form, and combination of data storage media and/or device. For example, storage device 1006 may include, but is not limited to, any combination of the non-volatile media and/or volatile media described herein. Electronic data, including data described herein, may be temporarily and/or permanently stored in storage device 1006. For example, data representative of computer-executable instructions 1012 configured to direct processor 1004 to perform any of the operations described herein may be stored within storage device 1006. In some examples, data may be arranged in one or more location databases residing within storage device 1006.

I/O module 1008 may include one or more I/O modules configured to receive user input and provide user output. One or more I/O modules may be used to receive input for a virtual experience. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, cameras (e.g., visible light camera, depth sensor, etc.), and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 1000. For example, memory 102 may be implemented by storage device 1006, and processor 104 may be implemented by processor 1004.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

receiving, by a computing system via a user interface, a request from a user for a virtual representation of a device;

accessing, by the computing system and based on receiving the request, a virtual model of the device;

determining, by the computing system and based on the virtual model of the device, a size of the device;

generating, by the computing system and based on imagery of a hand of the user, a virtual model of the hand of the user;

determining, by the computing system and based on the imagery of the hand of the user, a size of the hand of the user, and an amount of curl of the hand of the user;

determining, by the computing system and based on the size of the device, the size of the hand, and the amount of curl of the hand, a first portion of the virtual model of the device that occludes a representation of the hand of the user, and a second portion of the virtual model of the device that is occluded by the representation of the hand of the user; and providing, by the computing system via the user interface and based on the virtual model of the device and the virtual model of the hand of the user, an interactive virtual representation of the device as held in the hand of the user, the interactive virtual representation including, based on the size of the device relative to the size of the hand of the user, and based on the first portion and the second portion, a fit of the device in the hand of the user.

2. The method of claim 1, wherein the determining the size of the hand of the user is based on one or more images of the imagery of the hand, wherein the one or more images depict a palm of the hand with fingers of the hand open.

3. The method of claim 2, wherein the determining the size of the hand of the user comprises:

processing the one or more images to remove a background of the one or more images; and determining, based on the processing, widths of the fingers of the hand.

4. The method of claim 2, wherein the determining the size of the hand of the user comprises determining, based on the one or more images, locations of joints of the fingers of the hand.

5. The method of claim 4, wherein the determining the size of the hand comprises determining, based on the locations of the joints, lengths of portions of the fingers between the joints.

6. The method of claim 1, wherein the virtual model of the hand comprises a mesh representing the hand of the user.

7. The method of claim 1, wherein the providing the interactive virtual representation comprises showing a device user interface of the device on the virtual representation.

8. The method of claim 7, wherein the providing the interactive virtual representation further comprises:

detecting, based on the imagery of the hand of the user, or imagery of an additional hand of the user, a gesture of the user interacting with the virtual representation of the device; and depicting, based on the detecting, an interaction with the device user interface in accordance with the gesture.

9. The method of claim 1, further comprising:

receiving an additional request from the user for an additional device to compare with the device;

accessing, based on receiving the additional request, an additional virtual model of the additional device; and providing, by the computing system via the user interface and based on the additional virtual model of the additional device, the interactive virtual representation of the device with an additional interactive virtual representation of the additional device.

10. A system comprising:

a memory storing instructions; and a processor communicatively coupled with the memory and configured to execute the instructions to perform a process comprising:

receiving, via a user interface, a request from a user for a virtual representation of a device;

accessing, based on receiving the request, a virtual model of the device;

determining, based on the virtual model of the device, a size of the device;

generating, based on imagery of a hand of the user, a virtual model of the hand of the user;

determining, based on the imagery of the hand of the user, a size of the hand of the user, and an amount of curl of the hand of the user;

determining, based on the size of the device, the size of the hand, and the amount of curl of the hand, a first portion of the virtual model of the device that occludes a representation of the hand of the user, and a second portion of the virtual model of the device that is occluded by the representation of the hand of the user; and providing, via the user interface and based on the virtual model of the device and the virtual model of the hand of the user, an interactive virtual representation of the device as held in the hand of the user, the interactive virtual representation including, based on the size of the device relative to the size of the hand of the user, and based on the first portion and the second portion, a fit of the device in the hand of the user.

11. The system of claim 10, wherein the determining the size of the hand of the user is based on one or more images of the imagery of the hand, wherein the one or more images depict a palm of the hand with fingers of the hand open.

12. The system of claim 11, wherein the determining the size of the hand of the user comprises determining, based on the one or more images, locations of joints of the fingers of the hand.

13. The system of claim 10, wherein the virtual model of the hand comprises a mesh representing the hand of the user.

14. The system of claim 10, wherein the providing the interactive virtual representation comprises showing a device user interface of the device on the virtual representation.

15. The system of claim 14, wherein the providing the interactive virtual representation further comprises:

detecting, based on the imagery of the hand of the user, or imagery of an additional hand of the user, a gesture of the user interacting with the virtual representation of the device; and depicting, based on the detecting, an interaction with the device user interface in accordance with the gesture.

16. A non-transitory computer-readable medium storing instructions that, when executed, direct a processor of a computing device to perform a process comprising:

receiving, via a user interface, a request from a user for a virtual representation of a device;

accessing, based on receiving the request, a virtual model of the device;

determining, based on the virtual model of the device, a size of the device;

generating, based on imagery of a hand of the user, a virtual model of the hand of the user;

determining, based on the imagery of the hand of the user, a size of the hand of the user, and an amount of curl of the hand of the user;

determining, based on the size of the device, the size of the hand, and the amount of curl of the hand, a first portion of the virtual model of the device that occludes a representation of the hand of the user, and a second portion of the virtual model of the device that is occluded by the representation of the hand of the user; and providing, via the user interface and based on the virtual model of the device and the virtual model of the hand of the user, an interactive virtual representation of the device as held in the hand of the user, the interactive virtual representation including, based on the size of the device relative to the size of the hand of the user, and based on the first portion and the second portion, a fit of the device in the hand of the user.

17. The non-transitory computer-readable medium of claim 16, wherein the determining the size of the hand of the user is based on one or more images of the imagery of the hand, wherein the one or more images depict a palm of the hand with fingers of the hand open.

18. The non-transitory computer-readable medium of claim 16, wherein the virtual model of the hand comprises a mesh representing the hand of the user.

19. The non-transitory computer-readable medium of claim 16, wherein the providing the interactive virtual representation comprises showing a device user interface of the device on the virtual representation.

20. The non-transitory computer-readable medium of claim 19, wherein the providing the interactive virtual representation further comprises:

detecting, based on the imagery of the hand of the user, or imagery of an additional hand of the user, a gesture of the user interacting with the virtual representation of the device; and depicting, based on the detecting, an interaction with the device user interface in accordance with the gesture.

* * * * *